United States Patent
White et al.

(10) Patent No.: US 11,351,480 B2
(45) Date of Patent: Jun. 7, 2022

(54) EMULSION LAYER ALARM SYSTEM FOR PREVENTION OF PROCESS UPSETS IN ELECTROSTATIC COALESCERS

(71) Applicant: Saudi Arabian Oil Company, Dhahran (SA)

(72) Inventors: Ramsey James White, Abqaiq (SA); Miguel Angel Lopez Andreu, Abqaiq (SA); Abdullah Abdulrahman Al-Hamoud, Abqaiq (SA); Leela Sankar B. Akurathi, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 180 days.

(21) Appl. No.: 16/781,538

(22) Filed: Feb. 4, 2020

(65) Prior Publication Data
US 2021/0236960 A1    Aug. 5, 2021

(51) Int. Cl.
*G08B 21/00*        (2006.01)
*B01D 17/12*        (2006.01)
(Continued)

(52) U.S. Cl.
CPC ............ *B01D 17/12* (2013.01); *B01D 17/06* (2013.01); *G01N 27/223* (2013.01); *G08B 21/182* (2013.01)

(58) Field of Classification Search
CPC ...... B01D 17/12; B01D 17/06; B01D 17/047; G01N 27/223; G08B 21/182; C10G 31/08; C10G 33/08; C10G 33/04
(Continued)

(56) References Cited

U.S. PATENT DOCUMENTS

| 5,612,490 A | 3/1997 | Carlson et al. |
| 6,535,795 B1 * | 3/2003 | Schroeder ............ G05B 13/029 210/143 |

(Continued)

FOREIGN PATENT DOCUMENTS

GB        1364943        8/1974

OTHER PUBLICATIONS

PCT International Search Report and Written Opinion in International Appln. No. PCT/US2021/016455, dated May 26, 2021, 12 pages.

*Primary Examiner* — Anh V La
(74) *Attorney, Agent, or Firm* — Fish & Richardson P.C.

(57) ABSTRACT

A computer-implemented method includes receiving, by a programmable logic controller coupled to a control unit associated with a vessel containing oil and water within a Gas-Oil-Separation Plant (GOSP), a first signal representing a first capacitance measurement detected by a first capacitance probe attached to the vessel at a first elevation. Determining whether an alarm condition is met by detecting whether the first capacitance measurement is higher than a first predetermined maximum limit, or a rate of change (ROC) of the first capacitance measurement is higher than a first predetermined ROC limit, or both. If the alarm condition is met, sending an alarm signal indicating that an upcoming process upset has been detected within the vessel. Subsequent alarms at higher elevations, if available, can alarm operators if the emulsion layer thickness continues to increase and further mitigation measures are required (such as higher demulsifier dosage, skimming of emulsion layer, etc.).

27 Claims, 8 Drawing Sheets

(51) Int. Cl.
*B01D 17/06* (2006.01)
*G01N 27/22* (2006.01)
*G08B 21/18* (2006.01)

(58) Field of Classification Search
USPC .................. 340/604, 603, 606, 620, 612
See application file for complete search history.

(56) References Cited

U.S. PATENT DOCUMENTS

| | | |
|---|---|---|
| 9,645,002 B2 | 5/2017 | Zhang et al. |
| 10,077,405 B2 | 9/2018 | Daage et al. |
| 10,968,402 B1* | 4/2021 | Raynel .................. C10G 33/04 |
| 2008/0099404 A1* | 5/2008 | Markham ............... C02F 1/281 |
| | | 210/663 |
| 2011/0151576 A1* | 6/2011 | Perfect ................ G01N 21/643 |
| | | 436/172 |
| 2013/0026082 A1 | 1/2013 | Al-Shefei et al. |
| 2014/0202929 A1 | 7/2014 | Mason et al. |
| 2014/0251874 A1 | 9/2014 | Barroeta et al. |
| 2015/0152340 A1 | 6/2015 | Cherney et al. |
| 2016/0047792 A1 | 2/2016 | Ghosh et al. |

* cited by examiner

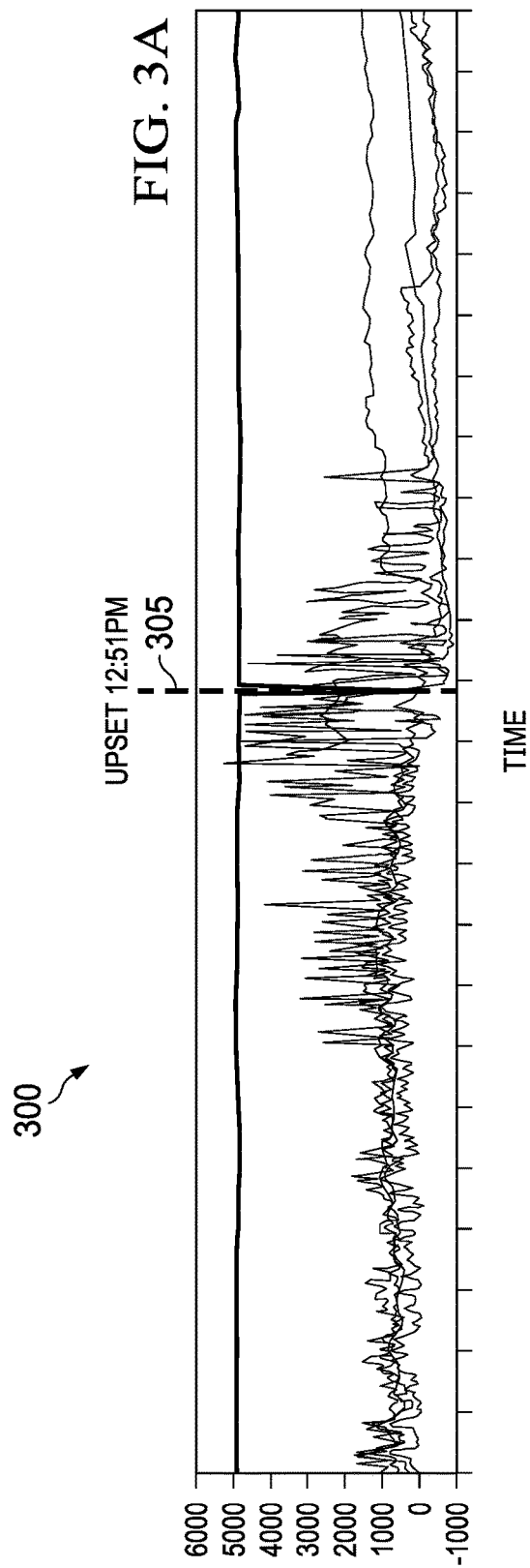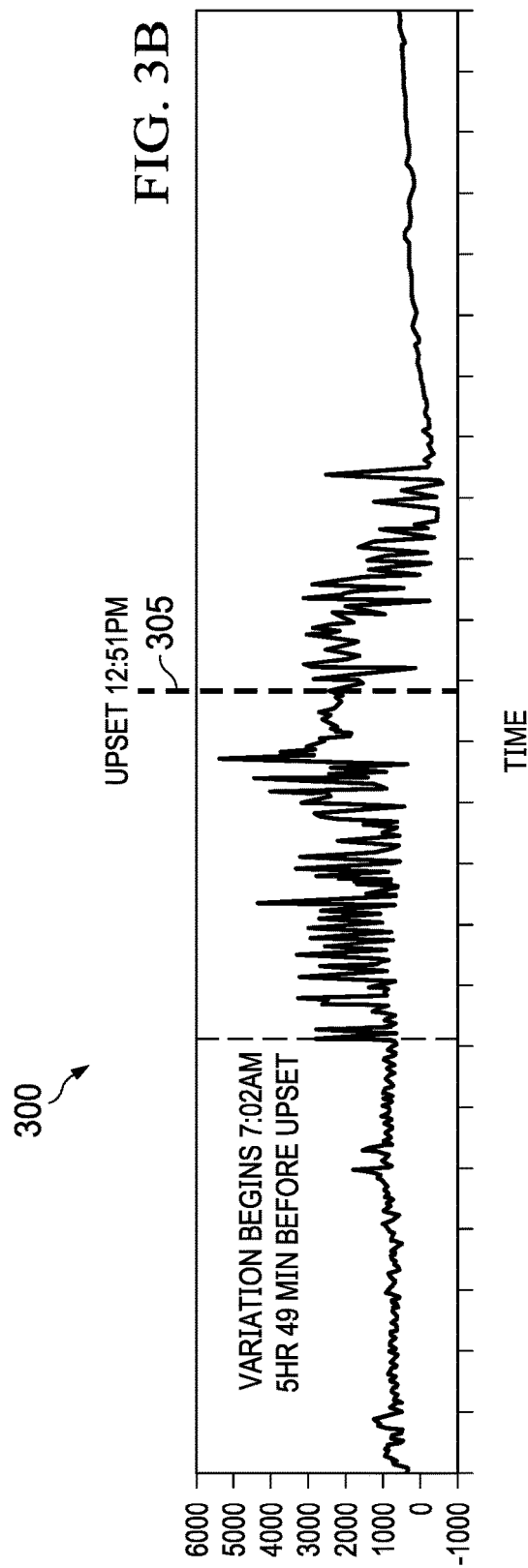

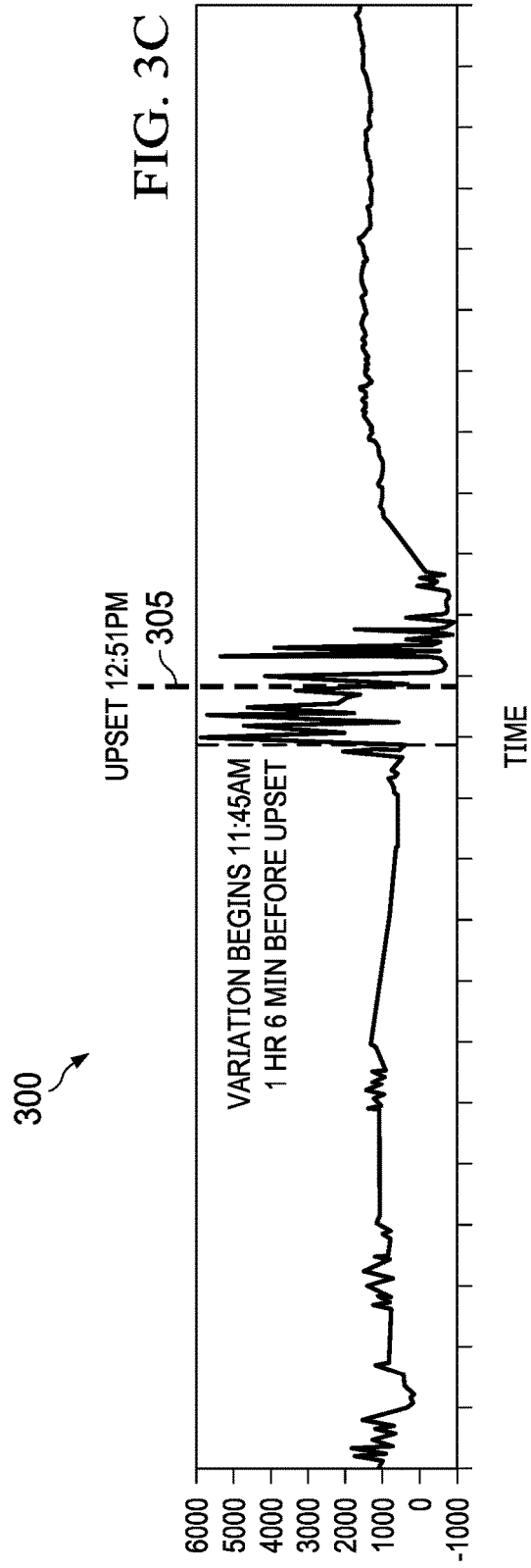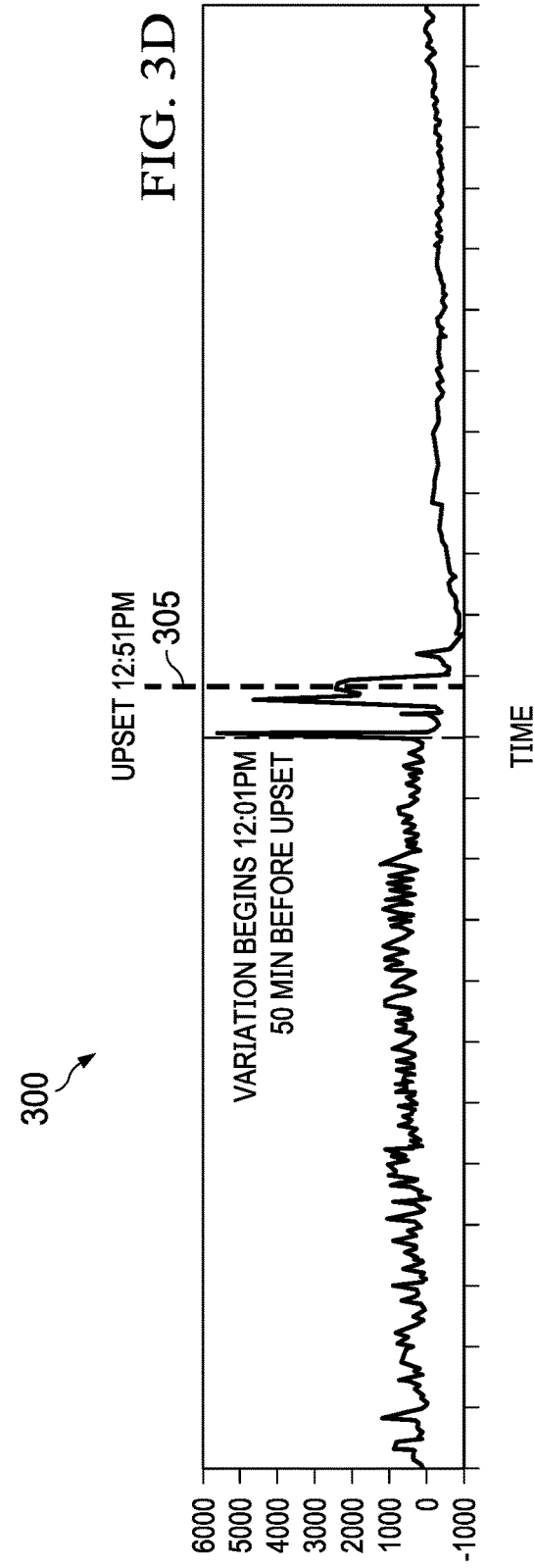

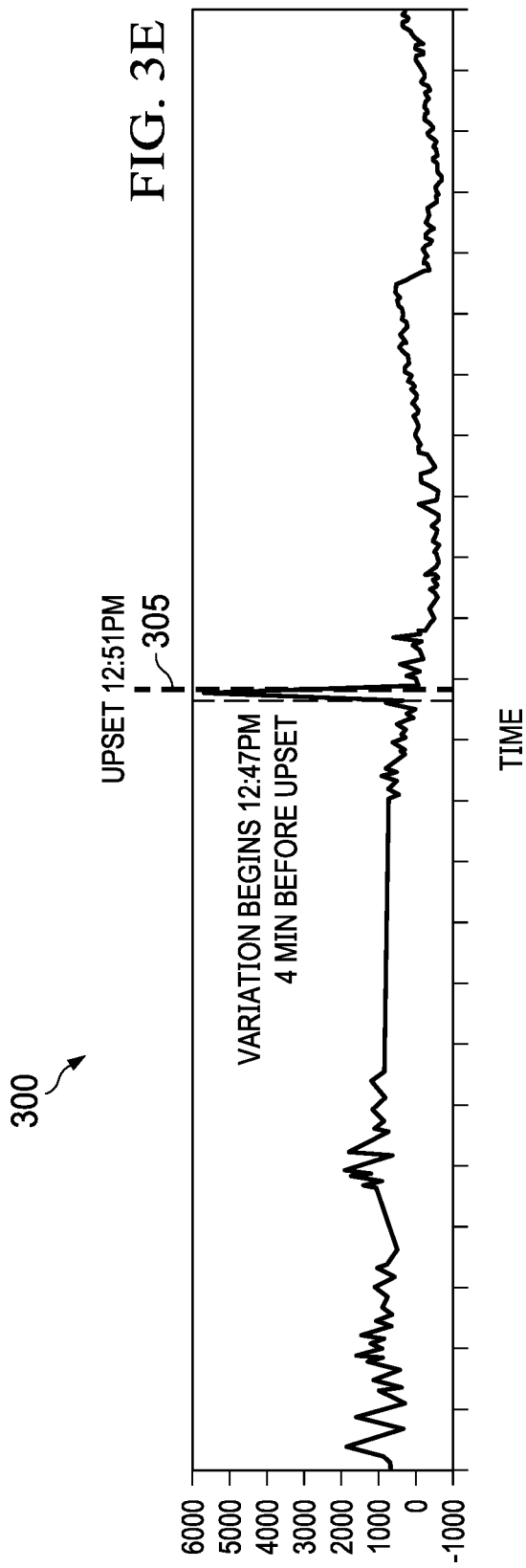

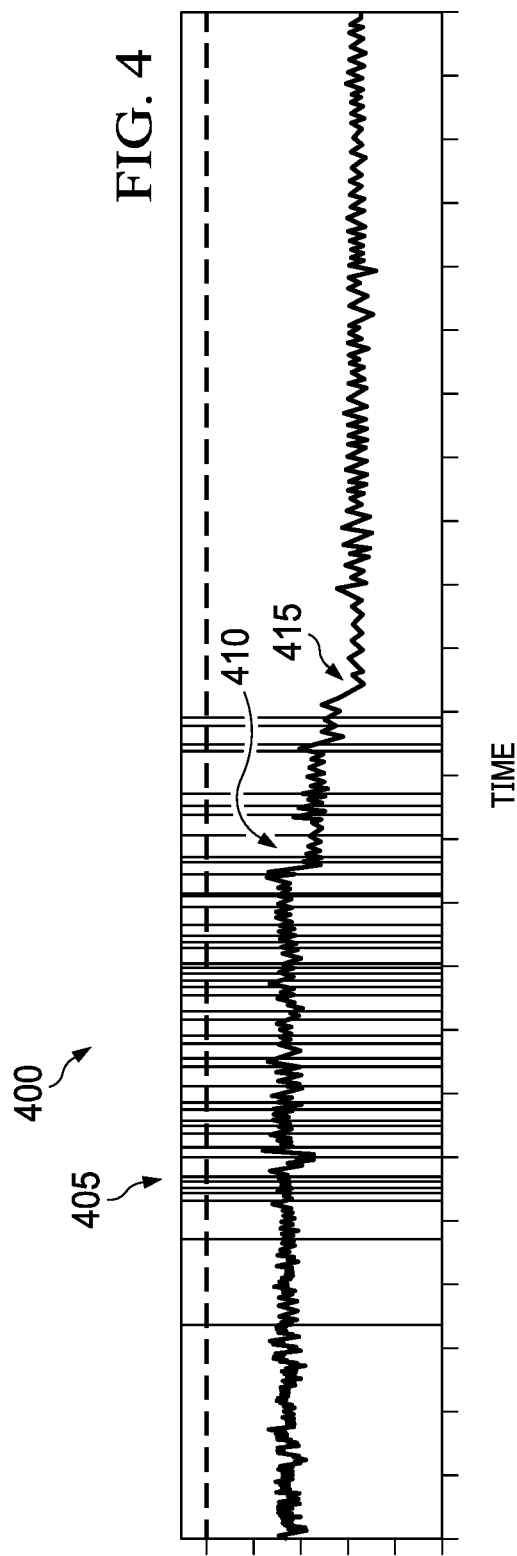

EMULSION LAYER ALARM SYSTEM FOR PREVENTION OF PROCESS UPSETS IN ELECTROSTATIC COALESCERS

TECHNICAL FIELD

This invention relates to detecting process upsets in electrostatic coalescers.

BACKGROUND

Raw crude produced from wells typically are a mixture of gas, liquid hydrocarbons, and salty formation water. In the upstream section of oil and gas industries, the function of a Gas-Oil-Separation Plant (GOSP) is to adequately separate gas and salty water from the crude oil to acceptable specifications for downstream processing and for easy transportation. Excessive salt and water in crude oil from a GOSP can result in corrosion in transportation pipelines and refining units and can also produce detrimental scaling effects. As part of the GOSP operations, produced crude oil is separated from salty water in a wet crude handling facility that includes dehydrator and desalter vessels. Demulsifier chemicals enhance the separation of the tight emulsion of salty water and oil according to specifications related to basic sediment and water content. A typical GOSP includes multiple phase separators in a separator train. These separators include high-pressure production traps (HPPT), low-pressure production traps (LPPT) and/or a low pressure degassing tank (LPDT). The concentrated crude is then delivered to a desalting train of one or more electrostatic coalescers (also known as dehydrators and desalters for a two-stage desalting train).

Various methods and systems can be used to determine levels in a variety of components and vessels such as a desalter unit of a GOSP or a refinery. However, the emulsion layer, which lies between the oil and water layer, is often not measured. Demulsifier chemicals can be under-dosed by injecting less demulsifier than needed, which can lead to an increase in emulsion layer thickness which may lead to process upsets in the desalting unit.

SUMMARY

During operation, a desalter unit can typically include some combination of oil, emulsion, water, and/or solids. Some crudes can tend to form emulsions that are difficult to break down, resulting in water and salt removal being reduced, the water content of the oil increasing, and upsets becoming common. Enhanced emulsion band detection and profiling can allow at least partial automation of the desalter operation and prediction of process upsets.

The present disclosure describes techniques that can be used for detecting the build-up of an emulsion layer based on the capacitance readings of multiple probes installed in an electrostatic coalescer. Based on a combination of the absolute capacitance reading with the rate of change of the capacitance of each probe installed at different elevations in the desalter vessel, the algorithm can predict whether a process upset is imminent.

In some implementations, a computer-implemented method includes the following. Receiving, by a programmable logic controller coupled to a control unit associated with a vessel containing oil and water within a Gas-Oil-Separation Plant (GOSP), a first signal representing a first capacitance measurement detected by a first capacitance probe attached to the vessel at a first elevation. Determining whether an alarm condition is met by detecting whether the first capacitance measurement is higher than a first predetermined maximum limit, or a rate of change (ROC) of the first capacitance measurement is higher than a first predetermined ROC limit, or both. If the alarm condition is met, sending an alarm signal indicating that an upcoming process upset has been detected within the vessel.

Embodiments of the method can include one or more of the following features. The first capacitance measurement being higher than the first predetermined maximum limit indicates a maximum limit in concentration of water around the first capacitance probe and the rate of change of the first capacitance measurement being higher than the first predetermined ROC limit indicates encroachment of water droplets within the vessel into the oil near the first capacitance probe. The alarm signal includes an estimated time interval between the alarm condition being met and the upcoming process upset occurring. If the elevation of the first capacitance probe is near a top of the vessel and/or near to the charged grids/plates, determining that the alarm condition is met when either the first capacitance measurement is higher than the first predetermined maximum limit, or the ROC of the first capacitance measurement is higher than the first predetermined ROC limit. If the elevation of the first capacitance probe is not near a top of the vessel, determining that the alarm condition is met when both the first capacitance measurement is higher than the first predetermined maximum limit and if the ROC of the first capacitance measurement is higher than the first predetermined ROC limit. Relaying a signal to a component within the GOSP to take an action to mitigate the upcoming process upset, which can be automatic. Receiving, by the programmable logic controller, a second signal representing a second capacitance measurement detected by a second capacitance probe attached to the vessel at an elevation different from the first capacitance probe, and determining whether the alarm condition is met by detecting whether the second capacitance measurement is higher than a second predetermined maximum limit or that a ROC of the second capacitance measurement is higher than a second predetermined ROC limit, or both. The second predetermined maximum limit is different than the first predetermined maximum limit.

In some implementations, a non-transitory, computer-readable medium storing one or more instructions executable by a computer system to perform operations includes the following: receiving, by a programmable logic controller coupled to a control unit associated with a vessel containing oil and water within a Gas-Oil-Separation Plant (GOSP), a first signal representing a first capacitance measurement detected by a first capacitance probe attached to the vessel at a first elevation. Determining whether an alarm condition is met by detecting whether the first capacitance measurement is higher than a first predetermined maximum limit, or a ROC of the first capacitance measurement is higher than a first predetermined ROC limit, or both. If the alarm condition is met, sending an alarm signal indicating that an upcoming process upset has been detected within the vessel.

Embodiments of the method can include one or more of the following features. The first capacitance measurement being higher than the first predetermined maximum limit indicates a ROC of the first capacitance measurement being higher than the first predetermined ROC limit indicates encroachment of water droplets within the vessel into the oil near the first capacitance probe. The alarm signal includes an estimated time interval between the alarm condition being met and the upcoming process upset occurring. If the elevation of the first capacitance probe is near a top of the vessel and/or near to the charged grids/plates, determining that the alarm condition is met when the first capacitance measurement is higher than the first predetermined maximum limit, or the ROC of the first capacitance measurement is higher than the first predetermined ROC limit. If the elevation of the first capacitance probe is not near a top of the vessel and/or near to the charged grids/plates, determining that the alarm condition is met when the first capacitance measurement is higher than the first predetermined maximum limit and if the ROC of the first capacitance measurement is higher than the first predetermined ROC limit. Relaying a signal to a component within the GOSP to take an action to mitigate the upcoming process upset. Automatically relaying the signal to take the action to mitigate the upcoming process upset. Receiving, by the programmable logic controller, or a distributed control system, a second signal representing a second capacitance measurement detected by a second capacitance probe attached to the vessel at an elevation different from the first capacitance probe; and determining whether the alarm condition is met by detecting whether the second capacitance measurement is higher than a second predetermined maximum limit or that a ROC of the second capacitance measurement is higher than a second predetermined ROC limit, or both. The second predetermined maximum limit is different than the first predetermined maximum limit.

In some implementations, a computer-implemented system, includes the following: one or more processors, a non-transitory computer-readable storage medium coupled to the one or more processors and storing programming instructions for execution by the one or more processors. The programming instructions instructing the one or more processors to perform operations including receiving, by a programmable logic controller coupled to a control unit associated with a vessel containing oil and water within a Gas-Oil-Separation Plant (GOSP), a first signal representing a first capacitance measurement detected by a first capacitance probe attached to the vessel at a first elevation. Determining whether an alarm condition is met by detecting whether the first capacitance measurement is higher than a first predetermined maximum limit, or a rate of change (ROC) of the first capacitance measurement is higher than a first predetermined ROC limit, or both. If the alarm condition is met, sending an alarm signal indicating that an upcoming process upset has been detected within the vessel.

Embodiments of the method can include one or more of the following features. The first capacitance measurement being higher than the first predetermined maximum limit indicates a maximum limit in concentration of water around the first capacitance probe and the ROC of the first capacitance measurement being higher than the first predetermined ROC limit indicates encroachment of water droplets within the vessel into the oil near the first capacitance probe. The alarm signal includes an estimated time interval between the alarm condition being met and the upcoming process upset occurring. If the elevation of the first capacitance probe is near a top of the vessel and/or near to the charged grids/plates, determining that the alarm condition is met when the first capacitance measurement is higher than the first predetermined maximum limit, or the ROC of the first capacitance measurement is higher than the first predetermined ROC limit. If the elevation of the first capacitance probe is not near a top of the vessel and/or near to the charged grids/plates, determining that the alarm condition is met when the first capacitance measurement is higher than the first predetermined maximum limit and if the ROC of the first capacitance measurement is higher than the first predetermined ROC limit. Relaying a signal to a component within the GOSP to take an action to mitigate the upcoming process upset. Automatically relaying the signal to take the action to mitigate the upcoming process upset. Receiving, by the programmable logic controller, a second signal representing a second capacitance measurement detected by a second capacitance probe attached to the vessel at an elevation different from the first capacitance probe; and determining whether the alarm condition is met by detecting whether the second capacitance measurement is higher than a second predetermined maximum limit or that a ROC of the second capacitance measurement is higher than a second predetermined ROC limit, or both. The second predetermined maximum limit is different than the first predetermined maximum limit.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The profiler advantageously detects the encroachment of an emulsion layer in the oil, giving operators time to prevent a dehydrator process upset from occurring. Incorporating the alarm scheme described uses the profiler data to alert operators of the encroaching emulsions into the oil in time for them to take preemptive measures to prevent an upset.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings

DESCRIPTION OF DRAWINGS

FIGS. 3A-E are example data received from the probes of the capacitance profiler system of FIG. 2 that illustrate the prediction of a process upset.

FIG. 4 shows example data of a coalescer equipped with the capacitance profiler system of FIG. 2

Like reference symbols in the various drawings indicate like elements.

DETAILED DESCRIPTION

The following detailed description describes techniques for detecting process upsets in dehydrators. Various modifications, alterations, and permutations of the disclosed implementations can be made and will be readily apparent to those of ordinary skill in the art, and the general principles defined can be applied to other implementations and applications, without departing from scope of the disclosure. In some instances, details unnecessary to obtain an understanding of the described subject matter can be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 1A:
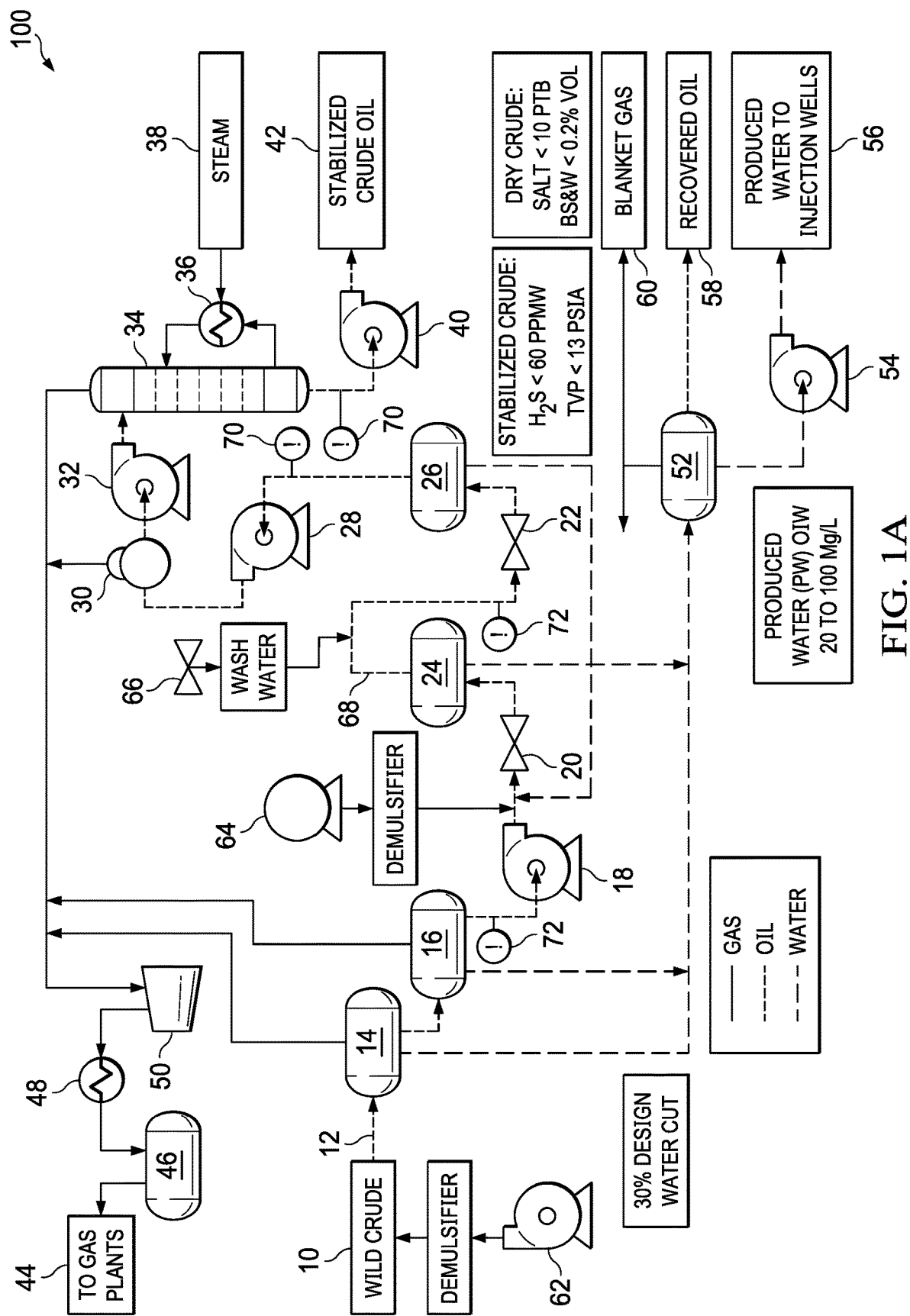
FIG. 1A is a schematic showing common features of a GOSP.

FIG. 1A is a schematic showing common features for a GOSP 100. The GOSP 100 receives wet crude 10 from upstream field via a trunk line 12 that feeds the crude into an HPPT 14, the first three-phase separation vessel where the gas and free water are separated from the crude. The separated wet crude exiting from the HPPT 14 is fed into a second stage LPPT 16 three-phase separation vessel for further separation. Two additional unit operations, for example, a wet/dry heat exchanger, and an LPDT can be included in the GOSP and are not illustrated in FIG. 1.

The wet crude oil exiting the LPPT 16 (or LPDT) is transferred by crude charge pumps 18 into wet crude handling facilities via mixing valves 20, 22. These can include a Wet Crude Handling (WCH) dehydrator 24 and a single/double stage WCH desalter 26, that treat the fluid to meet first Basic Sediment & Water (BS&W) specifications. The dehydrated/desalted crude is then pumped into an atmospheric spheroid or degassing tank 30 via a shipper pump 28 and then flows to a crude stabilizer column 34 via booster pump 32. Optionally, steam 38 can be injected into the crude after emerging from the reboiler 36 and before entering into the crude stabilizer. The produced export grade crude 42 is finally pumped by shipper pumps 40 to its destination. The gas streams from the production traps 14, 16, degassing tank 30, and the stabilizer 34 flow to the gas gathering compression system for onward delivery to gas processing plants 44.

Each stage of the compression plant includes a gas compressor 50, a compressor discharge cooler 48, and a compressor discharge gas knock-out vessel 46. The water stream from the productions traps 14, 16, and the WCH dehydrator 24 is pumped to a water oil separator 52 that separates water 56 from recovered oil 58. Blanket gas 60 is used to maintain normal operating pressure in the separator 52. The separator 52 removes the oil content and the separated water 56 is injected, via an injection pump 54, back into a water reservoir for water-flooding and pressure maintenance.

There can be two points 62, 64 for demulsifier injection in a GOSP 100. The first injection point 62 is upstream of the high pressure production trap 14 at the inlet 12 of the GOSP 100 and the second injection point 64 is upstream of the dehydrator 24 and desalter 26. The wash water 66 is injected into the dehydrated crude 68 entering the desalter 26 to meet the salt content specification of the produced crude.

The system illustrated in FIG. 1A can be equipped with one or more sensors 70, 72 to measure the BS&W content as well as the salt content in the oil stream at appropriate locations of GOSP 100. For example, the system can include one or more sensors, such as BS&W analyzers 70 for measuring a current value of BS&W at the dehydrator outlet or desalter outlet or at export crude outlet of the GOSP 100. Similarly, the system can include one or more sensors, such as salt content analyzers 72 for measuring a salt content in the oil stream after the oil exits the desalter outlet or at export crude outlet of the GOSP 100.

Figure 1B:
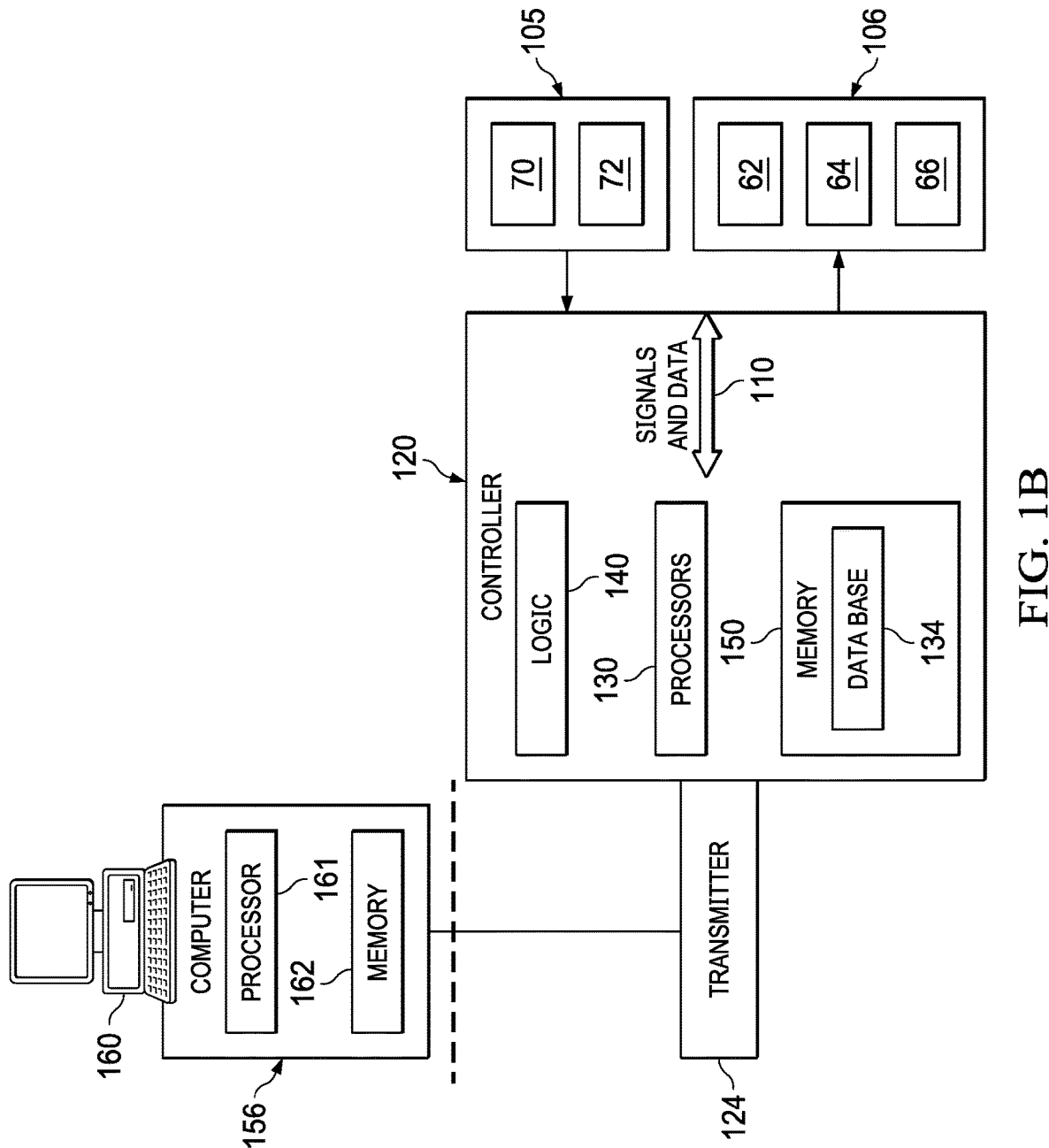
FIG. 1B is an extension of the system illustrated in FIG. 1A.

FIG. 1B is an extension of the system illustrated in FIG. 1A. The system can include one or more sensors 105, one or more actuators 106, and one or more controllers 120. A controller 120 can be operatively coupled to the sensors 105 and actuators 106 for controlling operation of the actuators 106 as well as retrieving or reading data from the sensors 105. The data can include sensor data from BS&W analyzers 70 reading a current value of BS&W at the dehydrator outlet or desalter outlet and an export crude outlet of the GOSP 100. The sensor data can include data from salt content analyzers 72 reading a salt content in the oil stream after the oil exits the desalter outlet or at export crude outlet of the GOSP 100. Similarly, the sensor data can include data from capacitance probes (discussed below) that measure the capacitance of fluid at one or more points within the GOSP 100.

The controller 120 can comprise a programmable drive and/or sampling control system. The controller can include logic 140 for acquiring sensor data and/or signals 110 from the sensors 105 and sending signals 110 to actuators 106. Memory 150, located inside or outside the controller 120, can be used to store acquired data, and/or processing results (e.g., in a database 134). The memory 150 is communicatively coupled to the processor(s) 130. The memory 150 can be located in or outside of GOSP 100. A data transmitter 124 can be used to transmit data and/or signals to the outside the GOSP for display by the quality control system, for example. Thus, the system can include the data transmitter 124 (e.g., a telemetry transmitter) to transmit the data to a surface data processing computer 156.

The system can further include a computer 156 coupled to and configured to communicate with, control, and/or display data received from the controller 120. The computer 156 can include a processor 161 and memory 162 for controlling the system. A monitor 160 can be coupled to the computer for displaying data that can include sensor data, transformed (e.g., filtered) sensor data, and/or feedback control data. The controller or programmable logic controller (PLC) 120 can form a part of the Distributed Control System (DCS) within the GOSP 100. The PLC 120 can be operatively coupled to a set of sensors 105 from which data can be acquired, and a set of actuators 106 that can be controlled by the PLC 120 based on the control strategy and algorithm stored in memory 150.

During normal GOSP operations, electrostatic coalescers (also dehydrators and desalters including the WCH dehydrator 24 and WCH desalter 26) are used for removing emulsified water and crude desalting. Perturbations to normal operations in the form of process upsets occasionally occur in such vessels and are caused by contact of the electrostatic grid to a chain of emulsion droplets between the energized grids and the vessel/ground. Such process upsets causes high current to flow through the emulsions and the loss of the electrostatic field that is needed for separation of water from oil. Corrective action from operations is needed to mitigate the upset, such as injecting emergency demulsifier and increasing the wash water rate. If not corrected, off-spec crude production can occur (e.g., not meeting BS&W specifications).

Figure 2:
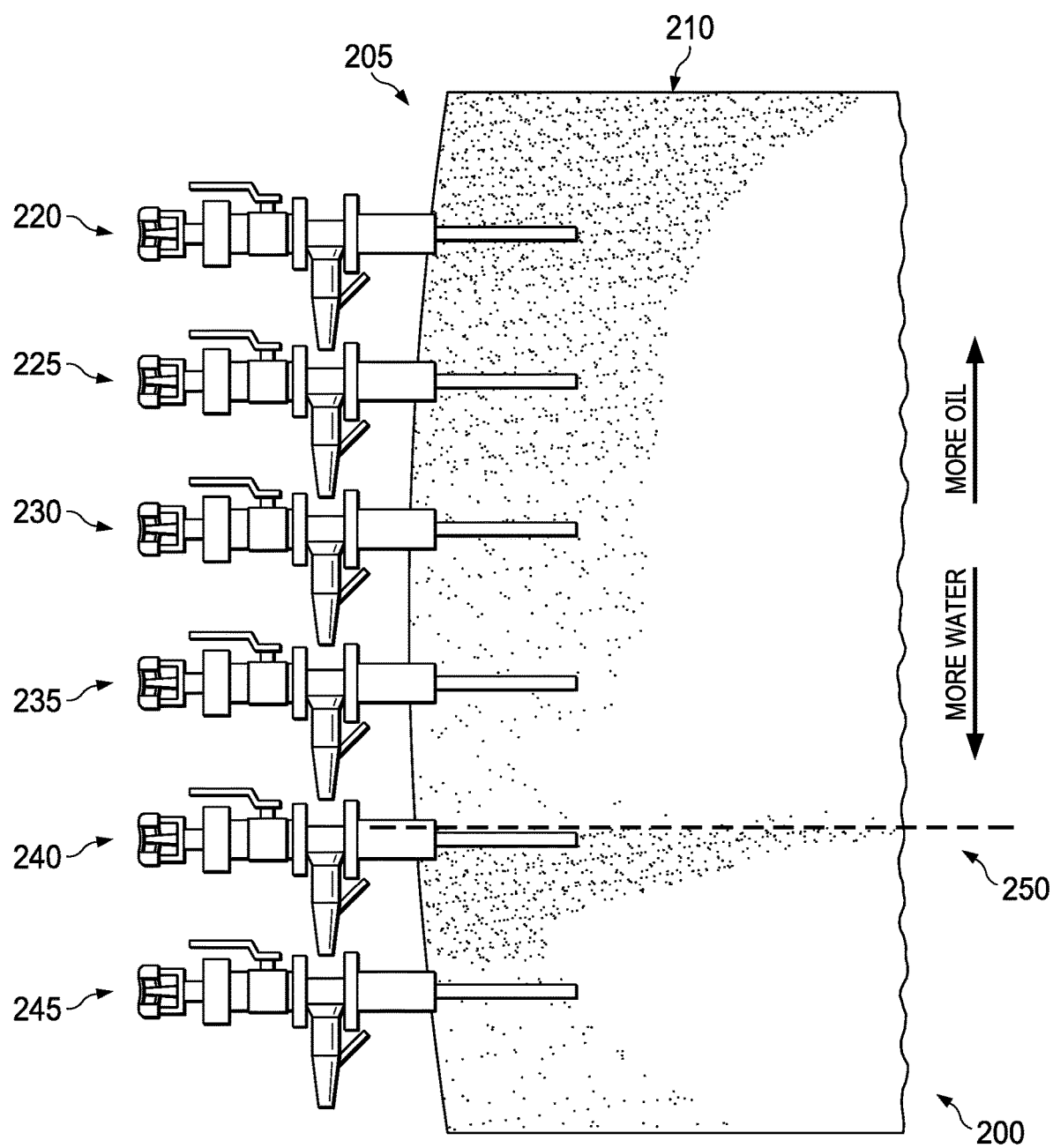
FIG. 2 is a schematic of a capacitance profiler system in a desalting unit.

Referring to FIG. 2, a capacitance profiler system 200 (or profiler system 200) is included in the GOSP 100 to detect process upsets. The capacitance profiler system 200 is a detection system installed in a coalescer 205 that can be, for example, the WCH dehydrator 24 or WCH desalter 26. The capacitance profiler system 200 is a capacitance-based profiler system that monitors the profile of the emulsion layer 210 in the coalescer 205, with oil tending toward the surface of the fluid tank. The capacitance profiler system uses sensors (e.g., sensors 105 in FIG. 1B) that are capacitance probes. Six capacitance probes are used, probes 220, 225, 230, 235, 240, and 245. Four of the probes (probes 220, 225, 230, and 235) are installed above the normal interface level 250 (between separated oil and water), one probe 240 is installed at the interface level 250 and one probe 245 below the interface level 250. Some or all of the probes 220, 225, 230, 235, 240, and 245 can be used in detecting and predicting process upsets.

The capacitance profiler system 200 measures the capacitance (the ability of a system to store an electric charge, typically measured in picofarads (pF)) of the fluid with which it is in contact. There is a linear relationship between capacitance and percent water content, and due to the significant difference in the dielectric properties of oil and of water, the capacitance profiler system 200 distinguishes the composition of the fluid layers and calculates the percent oil at the level at which each probe 220, 225, 230, 235, 240, 245 is installed. Both raw capacitance and percent oil can be reported by the profiler system 200.

Each of the four probes 220, 225, 230, 240 above the normal interface level 250 measures the absolute capacitance of the fluid at each respective vertical position. The four probes 220, 225, 230, 240 are used to detect the encroachment of emulsified water in the oil. Normally, the value of the capacitance increases as the water content increases (that is, with decreasing vertical position). However, prior to a dehydrator upset, capacitance values vary widely as undesirable emulsions start to develop. These aberrations in capacitance value are detected by the capacitance profiler system 200. This dynamic behavior occurs first at the probe closest above the interface level (probe 235), and then subsequently at all other probes in increasing order of elevation. Based on the detection of this dynamic behavior in capacitance, the DCS connected to the capacitance profiler system 200 notifies operations of an imminent upset in the coalescer 205.

The exemplary capacitance readings 300 shown in FIGS. 3A-E illustrate the dynamic capacitance behavior that occurs prior to a process upset that are detected by the capacitance profiler system 200 (with data from the probes shown in reverse order in FIGS. 3B to 3E than is shown in FIG. 2). FIG. 3A shows collected capacitance measurements taken over time for all four of the probes 220, 225, 230, 240, and includes a process upset that takes place as indicated by line 305. As shown in FIG. 3B, the probe just above the interface level (probe 235) records fluctuations in the capacitance reading at the earliest time point. In this example, the fluctuations begin approximately 6 hours before the process upset and continue through the process upset indicated by line 305. Capacitance fluctuations are measured in probe 230 (just above probe 235 in the coalescer 205, shown in FIG. 3C) at a later time point (approximately 70 minutes before the event), followed by probe 225 in FIG. 3D and then finally probe 220 nearest to the surface of the coalescer 205 records fluctuations just minutes before the event, as shown in FIG. 3E.

Based on this pattern of capacitance readings, the capacitance profiler system 200 will trigger an alarm in the DCS to alert operations to take mitigation measures to prevent the detected upcoming process upset. Measurements from each of the probes 220, 225, 230, 240 trigger activation of an alarm if an alarm condition is met. The alarm conditions are probe-dependent and include at least one of: (1) the absolute capacitance reading exceeds a maximum predetermined limit in concentration of water around the probe and (2) the rate of change (ROC) of the capacitance indicates the encroachment of water droplets into the oil near the probe by exceeding a predetermined ROC limit.

Table 1 shows example alarm-triggering conditions for each probe 220, 225, 230, 235, which are based on historical capacitance measurement data for a particular coalescer 205. The different capacitance thresholds or limits for each probe reflect that the water/oil mixture is different at each elevation, with the probes being set to detect the differing overall capacitance that occurs after being immersed in an emulsion with a differing concentration of water. The example alarm limits of Table 1 are examples of a specific dehydrator and probes 220, 225, 230, 235 that have been calibrated according to the dielectric properties of the fluids being treated in the particular GOSP 100 in which the capacitance profiler system 200 is installed.

TABLE 1

| Probe | Max limit (pF) | Max ROC (pF/h) |
|---|---|---|
| 220 | 197 | 8 pF/h |
| 225 | 198.5 | 8 pF/h |
| 230 | 225 | 8 pF/h |
| 235 | 200 | 8 pF/h |

In the example limits of Table 1, the maximum ROC is the same for each probe 220, 225, 230, 235. However, the ROC limit for each probe 220, 225, 230, 235 can be the same as, or different from the ROC limit for one or more of the other probes 220, 225, 230, 235.

The alarm-triggering logic is probe-dependent. For probes 225, 230, and 235, the capacitance profiler system 200 will trigger an alarm when both the respective max limit and the max ROC are detected for each probe 225, 230, 235. As is shown in FIG. 3E, probe 220 (the uppermost probe nearest the top of the coalescer 205) detects the triggering capacitance fluctuations closest in time to the actual process upset occurrence (that occurs at line 305). The alarm-determination logic for probe 220 is therefore more sensitive than for probes 225, 230, and 235, as variations in data read by probe 220 are effectively a "last chance" warning for operations that a process upset is imminent. Probe 220 thus will trigger an alarm when either the max limit or max ROC is detected indicating that droplets or a large change in capacitance is detected at the top probe 220 (and/or near to the charged grids/plates).

The exemplary capacitance readings 300 shown in FIGS. 3A-E illustrate that the capacitance profiler system 200 can predict the time to a detected upset. Based on the known time interval between an alarm condition being detected and the upset 305 occurring for each of the probes 220, 225, 230, 240, the capacitance profiler system 200 can alert operators to the anticipated or estimated time of the predicted upset. The time-to-upset prediction can give operators (whether human operators or automated systems) a time window in which to attempt to prevent the predicted upset.

As shown in the example in FIG. 4, knowledge of the time available to prevent the process upset can allow operators multiple attempts to correct the problem that is in process. FIG. 4 shows an example of the efficacy of the capacitance profiler system 200, with process upset alarms incorporated and used to alert operators to prevent a process upset from occurring. The graph shows capacitance data for an example coalescer. Capacitance fluctuations read by one of the probes 220, 225, 230, 240 triggered the alarm condition for the particular probe at time point 405. Operators effected an intervention at time point 410 to mitigate the upset (in this instance by reducing the interface level set point to keep the emulsions from encroaching into the oil phase). Other measures such as desludging, increasing demulsifier concentration at the production header, and emergency demulsifier injection upstream the dehydrator are also possible.

Monitoring of the capacitance profiler system 200 after the intervention at time point 410 indicated that the alarm condition was still in effect as indicated by at least one of the probes 220, 225, 230, 240. If the capacitance profiler system 200 does not determine that the alarm condition is no longer met after a correction time interval, a second (or third, fourth, or more) interventions can be carried out. In FIG. 4, operators effected a second intervention at time point 415. From the second intervention time point 415 onwards, the high variability at time point 405 that triggered the alarm condition stopped, and operations of the GOSP 100 could return to normal. Knowledge of the time to the predicted upset can allow operators (whether human or automated) to make such multiple interventions. Multiple interventions advantageously permits smaller changes in the parameters of the various components of the GOSP 100 at each intervention, and overall less perturbation to the system in an attempt to prevent the detected process upset.

The capacitance profiler system 200 also has the ability to continuously flush the probes 220, 225, 230, 240 to prevent buildup on the probes 220, 225, 230, 240. The capacitance profiler system 200 provides continuous measurement.

Referring again to FIG. 2, probes 220, 225, 230, 235 are immersed primarily in oil and normally indicate lower capacitance readings that to those of probe 240 and 245. An alarm is triggered when the capacitance starts to fluctuate at a set (and higher than normal) rate of change, which occurs when emulsions buildup at the layer at which the probe is immersed. Probe 240 is positioned at or very near to the oil-water interface level 250, and accordingly measures a high rate of change of capacitance during normal operations. Probe 245 is immersed primarily in water, which has high capacitance. A high variability in the capacitance reading from probe 245 can be used to indicate poor quality water, but is not generally used for the purpose of detecting an emulsion buildup.

Setting the appropriate values to calibrate the capacitance profiler system 200 can be included in the commissioning activities of the GOSP 100. The alarm limits found from calibration measurement data largely does not change over time a calibrated coalescer 205. However, if there is a change in crude type and/or water processed by the GOSP 100, a re-calibration of the values may be required. To ensure that the alarm limit values remain valid, it is recommended to revalidate the readings after every shutdown of the GOSP 100. Standard procedure is to sample the fluid 210 at various heights and compare the capacitance values to other testing methods; the probes 220, 225, 230, 235 can be similarly validated. Thus, the alarm conditions shown in Table 1 and the logic described with respect to probes 225, 230, and 235 vs. probe 240 can be adjusted as necessary.

Subsequent alarms at higher elevations, if available, can alarm operators if the emulsion layer thickness continues to increase and further mitigation measures are required (such as higher demulsifier dosage, skimming of emulsion layer, etc.)

Figure 5:
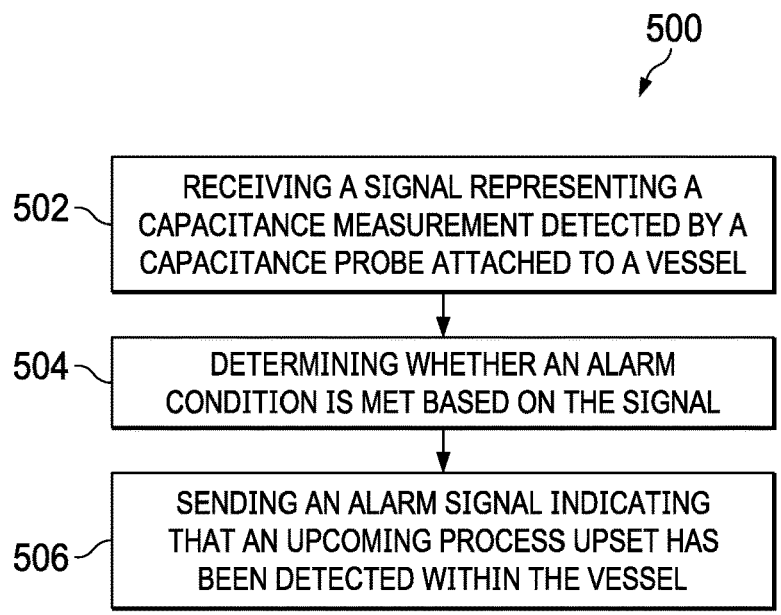
FIG. 5 is a block diagram illustrating an example computer system used to provide computational functionalities associated with described algorithms, methods, functions, processes, flows, and procedures as described in the present disclosure, according to some implementations of the present disclosure

FIG. 5 is a flowchart of an example method 500 for detecting an upcoming process upset, according to some implementations of the present disclosure. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 500 can be run in parallel, in combination, in loops, or in any order.

At 502, a first signal is received, by a programmable logic controller coupled to a control unit associated with a vessel containing oil and water within a Gas-Oil-Separation Plant (GOSP), the first signal representing a first capacitance measurement detected by a first capacitance probe attached to the vessel at a first elevation.

From 502, method 500 proceeds to 504. At 504, it is determined whether an alarm condition is met. Determining whether the alarm condition is met includes detecting whether the first capacitance measurement is higher than a first predetermined maximum limit, or a ROC of the first capacitance measurement is higher than a first predetermined ROC limit, or both.

From 504, method 500 proceeds to 506. If the alarm condition is met, an alarm signal is sent indicating that an upcoming process upset has been detected within the vessel.

In some implementations, the method 500 further includes receiving signals from a second, third, or fourth capacitance probe.

In some implementations, the capacitance profiler system 200 can use capacitance-based profiler arrangements other than the configuration described herein. For example, the probes of such a system can be installed horizontally in the side of the vessel. At least one probe would be arranged so as to be immersed in the oil layer, and the number of probes can used can include as many as the number of nozzles that are installed on the side of the vessel to accommodate them.

Figure 6:
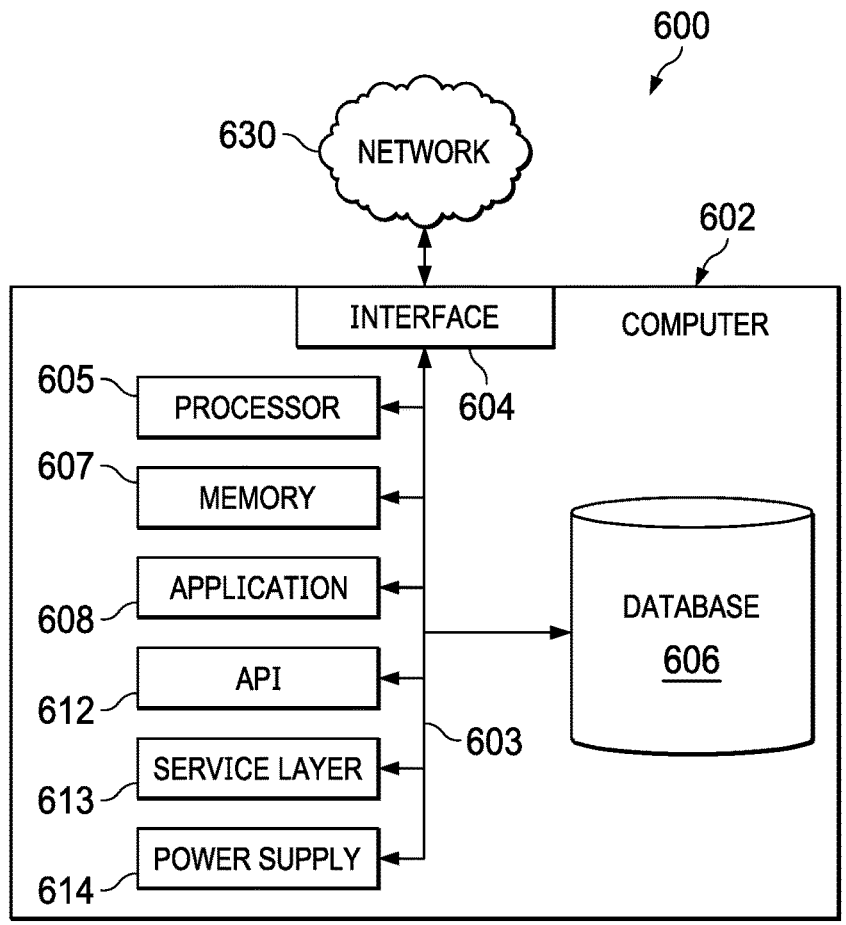
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure.

Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures can be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/nonvolatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking cannot be necessary since the locking of exchange file system can be done at application layer. Furthermore, Unicode data files can be different from non-Unicode data files.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:
1. A computer-implemented method, comprising:
receiving, by a programmable logic controller coupled to a control unit associated with a vessel containing oil and water within a Gas-Oil-Separation Plant (GOSP), a first signal representing a first capacitance measurement detected by a first capacitance probe attached to the vessel at a first elevation, wherein multiple capaci- tance probes are attached to the vessel, each capacitance probe associated with a different capacitance limit;

determining whether an alarm condition is met by detecting whether the first capacitance measurement is higher than a first predetermined maximum limit, or a rate of change (ROC) of the first capacitance measurement is higher than a first predetermined ROC limit, or both; and if the alarm condition is met, sending an alarm signal indicating that an upcoming process upset has been detected within the vessel.

2. The computer-implemented method of claim 1, wherein the first capacitance measurement being higher than the first predetermined maximum limit indicates a maximum limit in concentration of water around the first capacitance probe and the rate of change of the first capacitance measurement being higher than the first predetermined ROC limit indicates encroachment of water droplets within the vessel into the oil near the first capacitance probe.

3. The computer-implemented method of claim 1, wherein the alarm signal includes an estimated time interval between the alarm condition being met and the upcoming process upset occurring.

4. The computer-implemented method of claim 1, wherein if the elevation of the first capacitance probe is near a top of the vessel, determining that the alarm condition is met when either the first capacitance measurement is higher than the first predetermined maximum limit, or the ROC of the first capacitance measurement is higher than the first predetermined ROC limit.

5. The computer-implemented method of claim 1, wherein if the elevation of the first capacitance probe is not near a top of the vessel, determining that the alarm condition is met when both the first capacitance measurement is higher than the first predetermined maximum limit and if the ROC of the first capacitance measurement is higher than the first predetermined ROC limit.

6. The computer-implemented method of claim 1, comprising relaying a signal to a component within the GOSP to take an action to mitigate the upcoming process upset.

7. The computer-implemented method of claim 6, comprising automatically relaying the signal to take the action to mitigate the upcoming process upset.

8. The computer-implemented method of claim 1, further comprising:
receiving, by the programmable logic controller, a second signal representing a second capacitance measurement detected by a second capacitance probe attached to the vessel at an elevation different from the first capacitance probe; and
determining whether the alarm condition is met by detecting whether the second capacitance measurement is higher than a second predetermined maximum limit or that a ROC of the second capacitance measurement is higher than a second predetermined ROC limit, or both.

9. The computer-implemented method of claim 8, wherein the second predetermined maximum limit is different than the first predetermined maximum limit.

10. A non-transitory, computer-readable medium storing one or more instructions executable by a computer system to perform operations comprising:
receiving, by a programmable logic controller coupled to a control unit associated with a vessel containing oil and water within a Gas-Oil-Separation Plant (GOSP), a first signal representing a first capacitance measurement detected by a first capacitance probe attached to the vessel at a first elevation, wherein multiple capacitance probes are attached to the vessel, each capacitance probe associated with a different capacitance limit;

determining whether an alarm condition is met by detecting whether the first capacitance measurement is higher than a first predetermined maximum limit, or a ROC of the first capacitance measurement is higher than a first predetermined ROC limit, or both; and if the alarm condition is met, sending an alarm signal indicating that an upcoming process upset has been detected within the vessel.

11. The non-transitory, computer-readable medium of claim 10, wherein the first capacitance measurement being higher than the first predetermined maximum limit indicates a ROC of the first capacitance measurement being higher than the first predetermined ROC limit indicates encroachment of water droplets within the vessel into the oil near the first capacitance probe.

12. The non-transitory, computer-readable medium of claim 10, wherein the alarm signal includes an estimated time interval between the alarm condition being met and the upcoming process upset occurring.

13. The non-transitory, computer-readable medium of claim 10, wherein if the elevation of the first capacitance probe is near a top of the vessel, determining that the alarm condition is met when the first capacitance measurement is higher than the first predetermined maximum limit, or the ROC of the first capacitance measurement is higher than the first predetermined ROC limit.

14. The non-transitory, computer-readable medium of claim 10, wherein if the elevation of the first capacitance probe is not near a top of the vessel, determining that the alarm condition is met when the first capacitance measurement is higher than the first predetermined maximum limit and if the ROC of the first capacitance measurement is higher than the first predetermined ROC limit.

15. The non-transitory, computer-readable medium of claim 10, comprising relaying a signal to a component within the GOSP to take an action to mitigate the upcoming process upset.

16. The non-transitory, computer-readable medium of claim 15, comprising automatically relaying the signal to take the action to mitigate the upcoming process upset.

17. The non-transitory, computer-readable medium of claim 10, further comprising:
receiving, by the programmable logic controller, a second signal representing a second capacitance measurement detected by a second capacitance probe attached to the vessel at an elevation different from the first capacitance probe; and
determining whether the alarm condition is met by detecting whether the second capacitance measurement is higher than a second predetermined maximum limit or that a ROC of the second capacitance measurement is higher than a second predetermined ROC limit, or both.

18. The non-transitory, computer-readable medium of claim 17, wherein the second predetermined maximum limit is different than the first predetermined maximum limit.

19. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:

receiving, by a programmable logic controller coupled to a control unit associated with a vessel containing oil and water within a Gas-Oil-Separation Plant (GOSP), a first signal representing a first capacitance measurement detected by a first capacitance probe attached to the vessel at a first elevation, wherein multiple capacitance probes are attached to the vessel, each capacitance probe associated with a different capacitance limit;

determining whether an alarm condition is met by detecting whether the first capacitance measurement is higher than a first predetermined maximum limit, or a rate of change (ROC) of the first capacitance measurement is higher than a first predetermined ROC limit, or both; and if the alarm condition is met, sending an alarm signal indicating that an upcoming process upset has been detected within the vessel.

20. The system of claim 19, wherein the first capacitance measurement being higher than the first predetermined maximum limit indicates a maximum limit in concentration of water around the first capacitance probe and the ROC of the first capacitance measurement being higher than the first predetermined ROC limit indicates encroachment of water droplets within the vessel into the oil near the first capacitance probe.

21. The system of claim 19, wherein the alarm signal includes an estimated time interval between the alarm condition being met and the upcoming process upset occurring.

22. The system of claim 19, wherein if the elevation of the first capacitance probe is near a top of the vessel, determining that the alarm condition is met when the first capacitance measurement is higher than the first predetermined maximum limit, or the ROC of the first capacitance measurement is higher than the first predetermined ROC limit.

23. The system of claim 19, wherein if the elevation of the first capacitance probe is not near a top of the vessel, determining that the alarm condition is met when the first capacitance measurement is higher than the first predetermined maximum limit and if the ROC of the first capacitance measurement is higher than the first predetermined ROC limit.

24. The system of claim 19, comprising relaying a signal to a component within the GOSP to take an action to mitigate the upcoming process upset.

25. The system of claim 24, comprising automatically relaying the signal to take the action to mitigate the upcoming process upset.

26. The system of claim 19, further comprising:

receiving, by the programmable logic controller, a second signal representing a second capacitance measurement detected by a second capacitance probe attached to the vessel at an elevation different from the first capacitance probe; and determining whether the alarm condition is met by detecting whether the second capacitance measurement is higher than a second predetermined maximum limit or that a ROC of the second capacitance measurement is higher than a second predetermined ROC limit, or both.

27. The system of claim 26, wherein the second predetermined maximum limit is different than the first predetermined maximum limit.

* * * * *